(12) United States Patent
Zimmermann

(10) Patent No.: US 12,077,330 B2
(45) Date of Patent: Sep. 3, 2024

(54) FILLING DEVICE FOR FILLING CONTAINERS IN A SINGLE-USE ISOLATOR

(71) Applicant: Bausch + Ströbel Maschinenfabrik Ilshofen GmbH + Co. KG, Ilshofen (DE)

(72) Inventor: Markus Zimmermann, Rot am See (DE)

(73) Assignee: Bausch + Ströbel Maschinenfabrik Ilshofen GmbH + Co. KG, Ilshofen (DE)

( * ) Notice: Subject to any disclaimer, the term of this patent is extended or adjusted under 35 U.S.C. 154(b) by 320 days.

(21) Appl. No.: 17/599,384

(22) PCT Filed: Mar. 16, 2020

(86) PCT No.: PCT/EP2020/057052
§ 371 (c)(1),
(2) Date: Sep. 28, 2021

(87) PCT Pub. No.: WO2020/200719
PCT Pub. Date: Oct. 8, 2020

(65) Prior Publication Data
US 2023/0009715 A1    Jan. 12, 2023

(30) Foreign Application Priority Data
Mar. 29, 2019   (DE) .................. 10 2019 204 439.5

(51) Int. Cl.
*B65B 31/02*        (2006.01)
*B25J 21/02*        (2006.01)
(Continued)

(52) U.S. Cl.
CPC ............ *B65B 31/025* (2013.01); *B25J 21/02* (2013.01); *B65B 1/32* (2013.01); *B65B 3/003* (2013.01);
(Continued)

(58) Field of Classification Search
CPC ............. B65B 1/32; B65B 3/003; B65B 3/12; B65B 3/28; B65B 31/025; B65B 57/145;
(Continued)

(56) References Cited

U.S. PATENT DOCUMENTS 2,786,740 A * 3/1957 Taylor et al. ............ B25J 21/02
                                                  D24/234
10,166,686 B1   1/2019 Dhanjal et al.
(Continued)

FOREIGN PATENT DOCUMENTS

CN        104058357 A     9/2014
CN        104418277 A     3/2015
(Continued)

OTHER PUBLICATIONS

Indian Application No. 202117037560, Examination Report mailed Jan. 4, 2023, 5 pages.
Chinese Application No. CN202080022587.X, Office Action mailed Jun. 22, 2022, 7 pages.
German Application No. DE102019204439.5, Search Report, Oct. 17, 2019, 11 pages.
(Continued)

*Primary Examiner* — Stephen F. Gerrity
(74) *Attorney, Agent, or Firm* — Kilpatrick Townsend & Stockton LLP

(57) ABSTRACT

A filling device for metered filling of a filling material from a storage container into a dose receiving container. The device includes a single-use isolator with the receiving container provided therein to protect against contamination. The device includes a weighing device for holding and weighing the storage container, with its contents outside of the isolator. The device includes a dispensing device inside the isolator to provide a dose-by-dose dispensing of the material. The device includes a conduit arrangement for connecting the storage container and the dispending device
(Continued)

and conveying the material from the storage container to the dispensing device via a removal device for a dose-by-dose removal of the material outside the isolator. The device includes a control device for controlling the removal device based on information from the weighing device about a decrease in weight of a unit consisting of the storage container and its contents during the removal.

17 Claims, 1 Drawing Sheet

(51) Int. Cl.
  *B65B 1/32* (2006.01)
  *B65B 3/00* (2006.01)
  *B65B 3/12* (2006.01)
  *B65B 3/28* (2006.01)
  *B65B 57/14* (2006.01)
  *B65B 67/02* (2006.01)

(52) U.S. Cl.
  CPC ............... *B65B 3/12* (2013.01); *B65B 3/28* (2013.01); *B65B 57/145* (2013.01); *B65B 67/02* (2013.01)

(58) Field of Classification Search
  CPC ............... B65B 67/02; B67C 3/202; B67C 2003/2694; B25J 21/02
  USPC .......................................................... 53/502
  See application file for complete search history.

(56) References Cited

U.S. PATENT DOCUMENTS

| | | | |
|---|---|---|---|
| 2012/0031042 | A1 | 2/2012 | Zambaux |
| 2013/0017131 | A1* | 1/2013 | Galliher et al. ........ B01L 1/025 422/243 |
| 2014/0196411 | A1 | 7/2014 | Procyshyn et al. |
| 2015/0107190 | A1* | 4/2015 | Zambaux ................. B25J 21/02 53/287 |
| 2016/0368629 | A1 | 12/2016 | Storey |

FOREIGN PATENT DOCUMENTS

| | | | |
|---|---|---|---|
| CN | 107001020 A | 8/2017 | |
| CN | 108883848 A | 11/2018 | |
| DE | 102014207933 A1 * | 10/2015 | ............. G01M 3/02 |
| WO | 2010100234 A1 | 9/2010 | |
| WO | 2017127586 A1 | 7/2017 | |
| WO | 2018175947 A1 | 9/2018 | |

OTHER PUBLICATIONS

International Application No. PCT/EP2020/057052, International Search Report and Written Opinion mailed Aug. 3, 2020, 16 pages.
Hansel et al., "Vorteile von kundenspezifisch entwickelten Folienlosungen gegentiber Edelstahlsystemen im Containmentbereich", Available online at: Chemanager-online.com, Oct. 8, 2014, 3 pages.

* cited by examiner

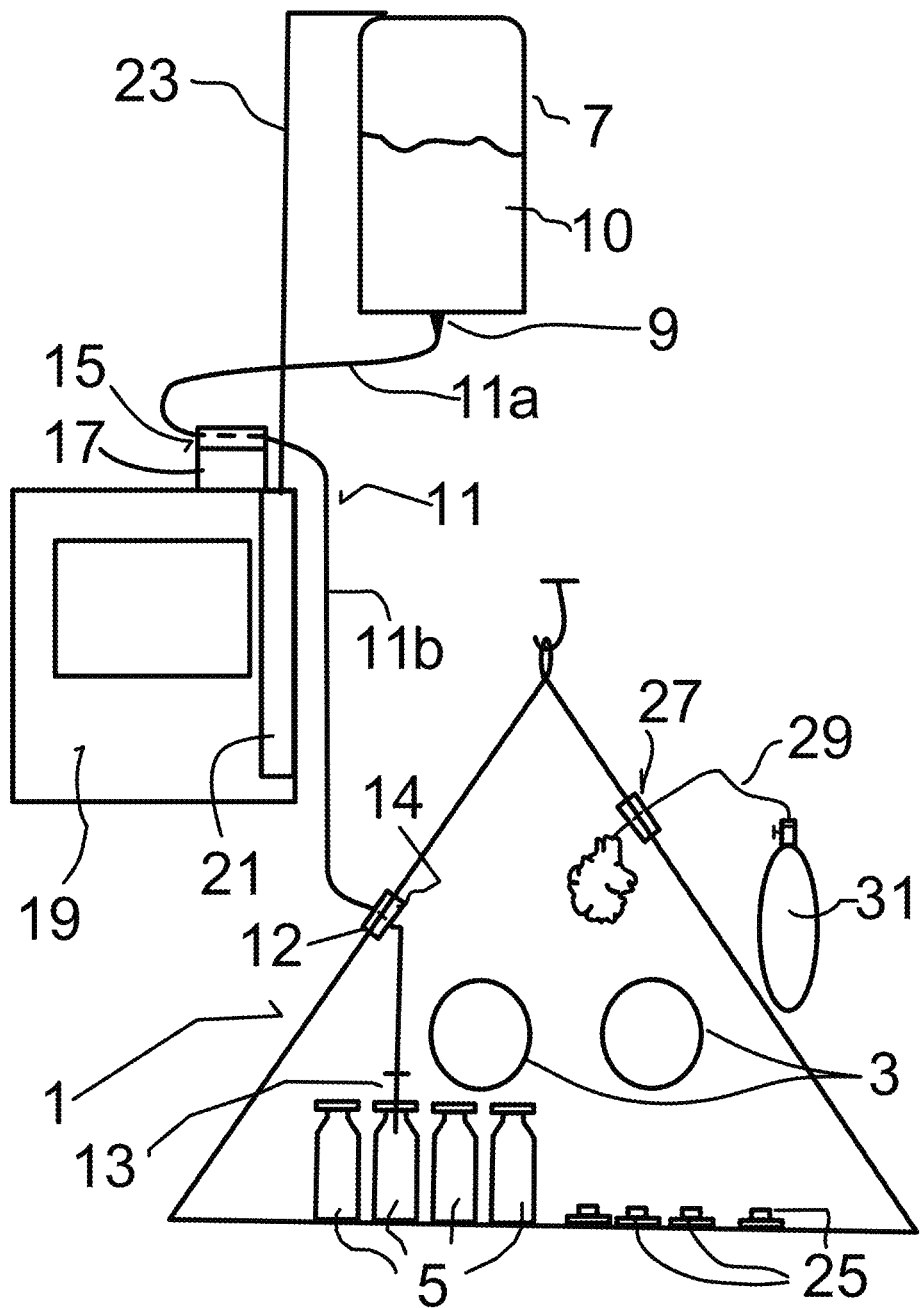

FILLING DEVICE FOR FILLING CONTAINERS IN A SINGLE-USE ISOLATOR

CROSS REFERENCE TO RELATED APPLICATION

This application is a U.S. national phase of International Patent Application No. PCT/EP2020/057052 filed on Mar. 16, 2020, which claims priority to German Patent Application No. 10 2019 204 439.5, filed in Germany on Mar. 29, 2019. The entire contents of both applications are hereby incorporated herein by this reference.

TECHNICAL FIELD

The field of application of the present invention related to the metered filling of aseptic or toxic substances, for example medicines, into filling containers in a manner that protects the substances being filled from contamination, and that prevents the substance being filled from escaping into the environment.

BACKGROUND

With previously known filling devices of the type considered here, there is the problem that it was difficult to detect the filling quantities as precisely as possible, or that laborious measures were required to do so. It is difficult to weigh the material dose receiving container positioned in a given single-use isolator by means of a weighing device provided outside of the single-use isolator during a filling process. This weighing also does not provide very reliable results, since a portion of the film wall of the single-use isolator between the weighing device and the given material dose receiving container always creates a disturbance. In-process control of the filling processes turns out to be difficult and imprecise with such a procedure.

Filling devices of the type in question here have also already been discussed in which a weighing device is provided in such a way that a weighing pan or weighing platform of the weighing device is positioned inside the single-use isolator, whereas the rest of the weighing device—with operating elements, display device, electronics, etc.—is arranged outside the single-use isolator. As such, it is possible to plug the weighing pan or weighing platform and weighing device together in a detachable, functional manner via a sterile, sealed plug connection in the region of a wall of the single-use isolator. Such an arrangement would thus allow a weighing process in which the film wall of the single-use isolator does not significantly interfere. The weighing pan would either have to be cleaned very carefully after completion of each filling process, or disposed of together with the single-use isolator. Also, the weighing device can then be used for further filling processes. Such an approach has also not proven to be advantageously practicable.

SUMMARY

The object of the present invention is that of providing a filling device for the metered filling of liquid or fine-powdered material from a filling material storage container into a contamination-protected material dose receiving container provided in a single-use isolator, which enables easily controllable and precise metering of the given filling quantities during the filling process with simple means, without contaminating components of the weighing device with filling material.

For this purpose, the filling device according to the invention has the following features:
- a single-use isolator, with the material dose receiving containers provided therein,
- a weighing device having means for holding and weighing the filling material storage container with its contents outside the single-use isolator, the filling material storage container being accommodated in or on the weighing device in readiness for weighing,
- a controllable filling material removal device for the dose-by-dose removal of filling material from the filling material storage container outside the single-use isolator,
- a filling material dispensing device within the isolator for the dose-by-dose dispensing of filling material to the given material dose receiving container in the single-use isolator,
- a conduit arrangement connecting the filling material storage container and the filling material dispensing device to each other to convey filling material removed from the filling material storage container by means of the filling material removal device to the filling material dispensing device, and
- a control device for controlling the filling material removal device according to information from the weighing device, wherein the control device is configured to measure the given filling material doses to be removed from the filling material storage container according to information about the decrease in weight of the unit consisting of the filling material storage container and its contents during the filling material removal.

BRIEF DESCRIPTION OF THE DRAWINGS

The FIGURE illustrates a filling device according to certain exemplary embodiments of the present disclosure.

DETAILED DESCRIPTION

The basic idea of the present invention is therefore to use a weighing device provided completely outside of the single-use isolator to determine the given dose quantities in such a way that in each case the unit consisting of the filling material storage container and its contents, which becomes lighter during a filling process by the weight of the filling quantity concerned, is monitored, and the filling material removal from the filling material storage container is halted when the weight reduction of the filling material storage container, including its contents, corresponds to the amount of the target weight value of the given filling dose. With such a procedure it is possible, with simple means, to precisely set and document the dose quantities without contaminating components of the weighing device with filling material. It is therefore not necessary to clean the weighing device or components thereof until sterility after each filling process.

A controllable peristaltic pump is preferably used as the filling material removal device, exerting a squeezing action on a conduit region of the conduit arrangement provided as a squeeze tube, and thereby displacing the filling material in the squeeze tube in the desired flow direction. The components of the peristaltic pump do not come into direct contact with the filling material. The peristaltic pump can be controlled by means of the control device so that it can be started and stopped in order to start and end each filling process.

The single-use isolator can have, in a manner known per se, a preferably transparent film wall made of plastic film which isolates the isolator interior from the external environment in a manner which protects against contamination. Such single-use isolators are relatively inexpensive and can be disposed of safely and in an orderly manner after use.

The single-use isolator preferably has, in a manner known per se, glove interaction means which allow handling of objects inside the single-use isolator, in particular for an operator to handle the material dose receiving container from the exterior. The operator can, for example, use the glove interaction means to position the material dose receiving container in a target filling position relative to the filling material dispensing device in the single-use isolator and/or to close the filling material receiving containers after filling with stoppers, screw caps or the like in the single-use isolator.

According to an advantageous development of the invention, the single-use isolator has means for routing the conduit arrangement through the isolator wall in a sterile manner, such that the filling material can be transported by means of the conduit arrangement from the filling material storage container provided outside the single-use isolator to the dispensing device provided inside the single-use isolator, without the risk of contaminating the exterior area of the single-use isolator.

The means for the sterile routing of the conduit arrangement through the isolator wall can be plug connection means which connect a conduit portion provided inside the single-use isolator to a conduit portion which leads to it, outside of the single-use isolator, in a manner which creates a sterile seal relative to the exterior in the intended plug connection state. When the plug connection is detached, the plug connection means provided on the single-use isolator seal the transition in a sterile manner.

In a further advantageous embodiment of the invention, the single-use isolator has connection means in its wall for connecting external lines, in particular protective gas lines, for a medium to be supplied to the interior of the single-use isolator in a manner which protects against contamination; this can be $CO_2$ or nitrogen, or purified air, such as laminar flowing air which is filtered by means of filters, e.g. HEPA filters. In this case, too, the connection means assigned to the single-use isolator seal in a sterile, tight manner if no external line is connected.

The filling material dispensing device is preferably a filling needle or, optionally, a plurality of filling needles, via which the filling material is introduced into the material dose receiving container.

The liquid storage container can be, for example, a plastic film pouch with a lower connection for the conduit arrangement.

The material dose receiving containers can be, for example, reagent vials such as, for example, medicine vials, test tubes and the like. Closure elements are preferably provided in the single-use isolator for closing the material dose receiving containers, such that the filled filling material dose receiving containers can be tightly sealed in the single-use isolator before they are removed.

According to a particularly preferred embodiment of the invention, the control device is configured to store a value of each dose quantity per filled filling material dose receiving container, in particular the detected dose weight, in association with the given filled filling material dose receiving containers, in order to implement an in-process control, thus creating the possibility of an ongoing monitoring of the quality of the filling processes.

An embodiment of the invention is explained in more detail below with reference to the schematic illustration of a filling device according to the invention, according to the FIGURE.

The FIGURE indicates a single-use isolator with the reference numeral 1; this is a type of closed tent with walls made of a transparent plastic film. The single-use isolator has two glove interaction holes 3 to which gloves (not shown), that are made of a flexible plastic material and that extend into the space of the single-use isolator 1, are attached in a sealing manner (glove box principle). An operator can reach into the glove interaction holes 3 in order to then move and handle objects in the single-use isolator 1 using the gloves. A particle counter and/or a germ collector can be provided in the single-use isolator in order to monitor or ensure the clean room quality therein.

Small bottles, for example vials, are situated in the single-use isolator 1 as material dose receiving containers 5, into which a—by way of example, toxic—liquid material is intended to be filled dose-by-dose as a filling material. The filling processes are intended to be carried out in such a way that the external area of the single-use isolator 1 is not contaminated in any way with filling material.

The filling material is initially located in a filling material storage container 7 outside the single-use isolator 1. The filling material storage container 7 can be, for example, a film pouch which has a filling material outlet 9 on its underside with a conduit portion 11a of a conduit arrangement 11 connected to it in a manner which creates a seal to the outside, which conduit portion is used to transfer filling material from the storage container 7 to the single-use isolator 1 and further to a filling needle 13 therein, which has the function of a filling material dispensing device within the single-use isolator 1. The conduit arrangement 11 consists substantially of a flexible plastic tube which is guided at 15 through a peristaltic pump 17, and there forms the squeeze tube portion of the peristaltic pump 17. This is the point at which the filling material contained therein is driven by a tube squeezing process in the target flow direction to the single-use isolator 1. This is followed by a conduit portion 11b which leads to the single-use isolator 1. The conduit arrangement 11 passes through the wall of the single-use isolator 1 in a sealed manner at 12, for which purpose corresponding means 14 for sterile routing of the conduit arrangement 11 through the isolator wall 14 are provided. This can also be plug connection means, for example.

The peristaltic pump 17 can be controlled by means of a control device 19—that is, it can be started in a targeted manner to advance the filling material, and can be stopped to stop the movement of the filling material, such that in this way metering of the material conveyed by the peristaltic pump 17 between the pump start and pump stop is possible.

The control device 19 also has a weighing device 21 or is connected to such a device for receiving weighing results. The filling material storage container 7 is attached to a support rod 23 of the weighing device 21, such that its weight and contents can be detected with the weighing device 21. Each filling process can then take place in such a way that at the beginning of the filling process the weight of the filling material storage container 7, with its contents, is detected by means of the weighing device 21 and registered by the control device 19, and in such a way that the weight of the filling material storage container 7 and its contents is also monitored during the further filling process. If the decrease in weight of the filling material container 7 due to the dispensing of the filling material therefrom reaches the target value of the weight of the desired filling dose, the peristaltic pump 17 is stopped at a corresponding time. An operator can then, by reaching into the gloves at 3, close the filled vial 5 with a stopper 25 held ready in the single-use isolator 1 and, if necessary, bring the next vial 5 to be filled into position for the filling needle 13, such that this vial is filled with a filling material dose in the subsequent filling process.

This can be continued in a corresponding manner until all the vials 5 have been dosed, filled and sealed.

The control device 19 is configured to store the dose quantity filled therein, in particular the dose weight, in association with each filling material dose receiving container 5 in order to implement an in-process control. In this way, it is also possible to easily recognise whether the filling quantity is outside a certain tolerance range for any of the material dose receiving containers 5. The filling quantity of the filling material can also be readjusted depending on the dosage. According to the result of the monitoring of the filled dose quantities within the tolerance limits, the revolutions of the peristaltic pump can be optimised accordingly.

At 27, the single-use isolator 1 has connection means in its wall for connecting external lines—in this case, a protective gas line 29 to which a given protective gas source 31 is connected. By means of this arrangement, protective gas, such as purified air, for example laminar air, CO2 or nitrogen which is filtered by filters, e.g. HEPA filters, can be introduced into the interior of the single-use isolator 1 in order to also generate a certain overpressure there, which prevents an overflow quantity from emerging from the filling needle 13 after each stop of the peristaltic pump 17.

Further elements can also be provided within the single-use isolator 1, such as caps and/or appropriate tools, for example single-use pliers and the like.

The invention claimed is:

1. A filling device for metered filling of a filling material from a filling material storage container into a material dose receiving container, comprising:
    a single-use isolator with the material dose receiving container provided therein;
    a weighing device having means for holding and weighing the filling material storage container with contents of the filling material storage container, outside of the single-use isolator, wherein the filling material storage container is accommodated in or on the weighing device for weighing;
    a controllable filling material removal device for removal of a dose of the filling material from the filling material storage container outside the single-use isolator;
    a filling material dispensing device inside the single-use isolator to introduce the dose of the filling material to the material dose receiving container in the single-use isolator;
    a conduit arrangement connecting the filling material storage container and the filling material dispensing device to convey the filling material removed from the filling material storage container by means of the filling material removal device to the filling material dispensing device; and
    a control device for controlling the filling material removal device based on information from the weighing device, wherein the control device is configured to measure the dose of the filling material to be removed from the filling material storage container and introduce into the material dose receiving container based on information about a decrease in weight of a unit comprising the filling material storage container and contents of the filling material storage container during the filling material removal.

2. The filling device of claim 1, wherein the filling material removal device is a controllable peristaltic pump.

3. The filling device of claim 1, wherein the single-use isolator has a film wall made of plastic film, wherein the film wall isolates an interior of the isolator from an outside environment to protect against contamination.

4. The filling device of claim 3, wherein the film wall is transparent.

5. The filling device of claim 1, wherein the single-use isolator further comprises glove interaction means to enable handling of objects inside the single-use isolator, from an outside of the single-use isolator.

6. The filling device of claim 5, wherein the objects inside the single-use isolator comprise the material dose receiving container.

7. The filling device of claim 1, wherein the single-use isolator further comprises means for routing the conduit arrangement in a sterile manner through a wall of the isolator.

8. The filling device of claim 1, wherein the single-use isolator further comprises connection means in a wall of the single-use isolator for connecting external lines for a medium to be supplied to an interior of the single-use isolator to protect against contamination.

9. The filling device of claim 8, wherein the external lines comprise protective gas lines.

10. The filling device of claim 1, wherein the filling material dispensing device comprises a filling needle.

11. The filling device of claim 1, wherein the filling material storage container is a plastic film pouch with a lower connection for the conduit arrangement.

12. The filling device of claim 1, wherein the material dose receiving container is one or more of reagent vials or medicine vials.

13. The filling device of claim 1, wherein closure elements are provided in the single-use isolator for closing the material dose receiving container.

14. The filling device of claim 1, wherein the control device is configured to store a value of each dose quantity per material dose receiving container to implement an in-process control.

15. The filling device of claim 14, wherein the value comprises a detected dose weight in association with the material dose receiving container.

16. The filling device of claim 1, wherein the filling material comprises a liquid filling material.

17. The filling device of claim 1, wherein the filling material comprises a fine-powdered filling material.

* * * * *